United States Patent [19]

Berlincourt et al.

[11] Patent Number: 4,485,324

[45] Date of Patent: Nov. 27, 1984

[54] PIEZOELECTRIC HIGH VOLTAGE IMPACT MECHANISM

[75] Inventors: Don A. Berlincourt, Russell Township, Cuyahoga County; Kendall A. Pim, Cleveland Heights; Joseph L. Randles, Willoughby Hills, all of Ohio

[73] Assignee: Channel Products, Inc., Chesterland, Ohio

[21] Appl. No.: 522,016

[22] Filed: Aug. 11, 1983

[51] Int. Cl.³ .................................................. H01L 41/08
[52] U.S. Cl. ............................................................ 310/339
[58] Field of Search .................. 310/338, 339; 361/260

[56] References Cited

U.S. PATENT DOCUMENTS 3,408,153 10/1968 Ishiguro ........................... 361/260 X
3,793,561 2/1974 Lundh .............................. 310/339 X

FOREIGN PATENT DOCUMENTS 1420956 1/1976 United Kingdom ................ 310/339

Primary Examiner—Mark O. Budd

[57] ABSTRACT

A new and improved piezoelectric high voltage impact mechanism uses an actuator with slanted internal walls to tilt a straight actuating spring. The spring constrains a hammer so that the hammer is held on a ledge in the body as actuation is initiated. Energy is stored in the spring during actuation and the actuator pushes the hammer off the ledge, initiating the impact. Component parts and assembly are simplified compared with prior art devices.

8 Claims, 5 Drawing Figures

PIEZOELECTRIC HIGH VOLTAGE IMPACT MECHANISM

This invention relates to piezoelectric high voltage devices in which the piezoelectric element is essentially struck. The invention involves an improved mechanism which provides operational and economic advantages over prior art devices.

BACKGROUND OF THE INVENTION

Piezoelectric high voltage devices of both the impact type and gradual squeeze type are known in the prior art. The impact type devices have a considerable cost advantage over squeeze devices as less bulky arrangements are required in order to provide the necessary force, and dimensional tolerances are much less severe.

The present invention addresses the economic problem of piezoelectric high voltage impact mechanisms and provides a device with fewer parts and easier assembly than with prior art devices.

It is therefore a primary object of the present invention to provide a new and improved piezoelectric impact high voltage mechanism that has a minimum number of low cost parts which are easily assembled. It is a further object of this invention to provide a piezoelectric high voltage impact mechanism which has simple, smooth and reliable operation.

Other objects, uses, advantages and novel features of this invention will be set forth in part in the description or may be learned by practice of the invention. The objects and advantages of the invention may be realized and attained by means of the instrumentalities, combinations and materials particularly pointed out in the appended claims.

SUMMARY OF THE INVENTION

To achieve the foregoing objects and in accordance with the purpose of the invention as embodied and broadly described herein, the mechanism contains several parts which serve more than a single purpose and the parts are themselves simple and readily manufacturable at low cost. The piezoelectric mechanism consists of housing means, which contains piezoelectric ceramic element means and adjacent metal end means, actuating spring means, return spring means, hammer means, and movable actuator means. Housing means also provides an internal ledge means which prevents the hammer from moving toward piezoelectric ceramic means until actuating spring means has been stressed so that there is sufficient stored energy in actuating spring means before actuator means releases hammer means from ledge means. Actuator means has slanted internal walls that hold actuating spring means at an angle so that hammer means is held by actuating spring means toward internal ledge means.

BRIEF DESCRIPTION OF THE DRAWINGS

The invention consists in the novel parts, constructions, arrangements, combinations, materials, methods, and improvements shown and described. The accompanying drawings which are incorporated in and constitute a part of this specification illustrate prior art devices and preferred embodiments of the present invention, and together with the description of the invention serve to explain the principals of the invention.

With reference to FIG. 1 an actuator means 10 according to a prior art device is shown. The actuator is made of an electrically insulating material such as injection molded thermoplastic. The actuating spring means fits inside the cavity 11. Note that the diameter of the cavity 11 and the diameter of the outside surface 12 are coaxial along the full length of the cavity; that is, the axes coincide along the full length of the cavity.

With reference to FIG. 2 an actuating spring and hammer means according to a prior art device is shown. The combination is denoted by the numeral 20. Actuating spring means 21 is curved and holds hammer means 22 at an angle.

FIG. 3 is a cross-sectional view of an actuator 30 according to this invention. Actuator means is made of an electrically insulating material such as injection molded thermoplastic. Actuating spring means fits inside cavity 31. The diameter of the cavity 31 and the diameter of the outside surface 32 are not coaxial. The cavity 31 consists of a back section 33 and a front section 34. Since actuating spring means fits essentially fully into the cavity 31, the spring is held at an angle essentially equal to the angle between the axis of back section 33 and the axis of the diameter of the outside surface 32. The front section 34 of actuator 30 is shown with a wider opening in order that actuator means 30 can easily be injection molded. Another way of describing the back section 33 is to state that it has slanted internal walls. Actuator means 30 has a section 35 which acts to prevent rotation of actuator means in body means of the device of FIG. 5.

FIG. 4 shows actuating spring means and hammer means according to this invention. The combination is denoted by the numeral 40. Actuating spring means 41 is straight and holds hammer means 42 so that the axes of hammer means 42 and actuating spring means 41 are essentially conicident. The slanted internal walls of actuator 30 of FIG. 3 causes this to be nearly parallel to the axis of the back section 33 of actuator means 36. The section of hammer means 43 which fits inside actuating spring means 41 fits moveably but with relatively low clearance. Likewise actuator spring means 41 fits moveably inside cavity back section 33 of actuator means 30 of FIG. 3 with relatively low clearance.

FIG. 5 shows one form of a piezoelectric high voltage impact mechanism of this invention denoted by the number 50. Piezoelectric element means 51 is disposed between front metallic adjacent end means 52 and back metallic adjacent end means or anvil means 53 within insulating body means 54. Electrical connection means are provided by terminal means 55 and narrow portion 56 of anvil means 53. Insulating body means 54 has ledge means 57 which prevents hammer means 58 from going beyond ledge means toward front adjacent end means 52 when actuator means 61 is pressed lightly. Return spring means 59 is disposed between front adjacent end means 52 and hammer means 58. Return spring means 59 pushes against hammer means 58 which carries the force to actuating spring means 60 and hence to actuator 61. Return spring means 59 is much less stiff than actuating spring means 60. Cap 62 snaps over body means 54 to hold actuator means inside body means.

Figure 1:
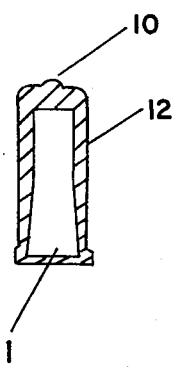
FIG. 1 is a schematic cross-sectional view of an actuator means constructed in accordance with one of the simplest prior art devices.

Operation of the high voltage piezoelectric mechanism 50 will now be described in detail. The rest position of the device is shown. Normally because of tolerance requirements hammer means 58 is held slightly above ledge means 57 but the angle of actuating spring means 60 will hold hammer means 58 slightly to the right so that a small movement downward of actuator means 30 will engage hammer means 58 on ledge means 57. As actuator means is pushed further, energy is stored in actuating spring 60. When the edge of actuator means engages the sloped upper surface of flange 63 of hammer means 58, a further movement downward of actuator means 61 pushes hammer means 58 off ledge means 57. Actuating spring 60 than expands, throwing hammer 58 against front adjacent end means 52. Return spring means 59 resists the hammer, but its stiffness is much less than that of actuating spring means 60. The blow imparted to front adjacent end means 52 causes an elastic wave to pass through piezoelectric element means 51 generating a high voltage pulse between terminal means 55 and 56. Return spring means 59 then pushes against hammer means 58, which in turn pushes against actuating spring means 60, which pushes against actuator means 61, all these parts moving upward until the initial rest position is again established. Section 64 of actuator means 61 prevents actuator means from rotating in body means 54 when actuator means is pushed downward. Section 64 fits inside a vertical slot in body means 54.

Figure 2:
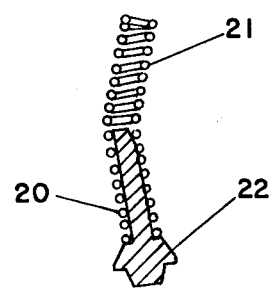
FIG. 2 is a schematic cross-sectional view of an actuating spring means constructed in accordance with one of the simplest prior art devices, with hammer means installed.
Figure 3:
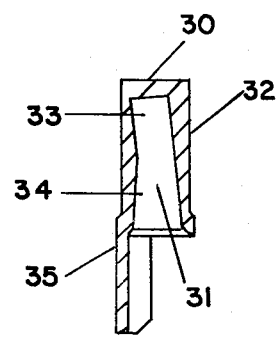
FIG. 3 is a schematic cross-sectional view of an actuator means constructed in accordance with this invention.
Figure 4:
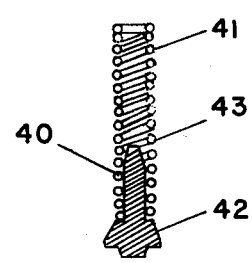
FIG. 4 is a schematic cross-sectional view of an actuating spring means constructed in accordance with this invention, with hammer means installed.
Figure 5:
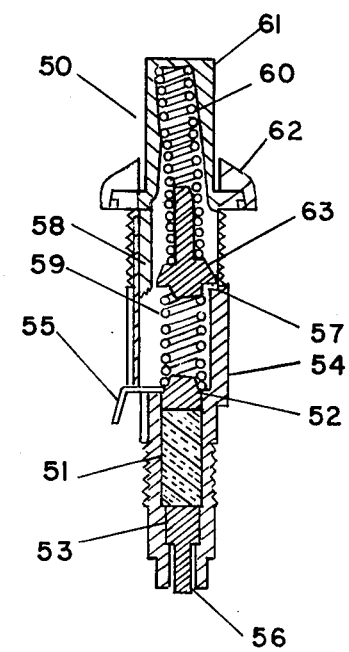
FIG. 5 is a schematic cross-sectional view of a piezoelectric high voltage mechanism constructed in accordance with this invention.

The piezoelectric high voltage impact mechanism of this invention consists of few simple and economical component parts, and assembly is simple and economical. Operation is very smooth; notably so in comparison with mechanisms incorporating the bent actuating spring means 21 shown in FIG. 2.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of this invention.

What is claimed is:

1. An impact type piezoelectric high voltage mechanism comprising:
   housing means;
   ledge means contained within said housing means;
   actuator means movable in said housing means; said actuator means having a blind bore formed therein;
   hammer means receivable in said housing means;
   actuating spring means received within said blind bore and operably connected to said hammer means; and
   piezoelectric element means received in said housing, said piezoelectric element means responsive to mechanical actuation thereof to produce a spark;
   said blind bore in said actuator means having a longitudinal axis offset from the longitudinal axis of said actuator means causing said actuating spring means and said hammer means to be positioned at an angle offset from the longitudinal axis of said housing means resulting in the engagement of said hammer means with said ledge means upon the inward movement of said actuator means in said housing means.

2. An impact type piezoelectric high voltage mechanism as defined in claim 1 wherein during actuation of said mechanism, said actuating spring means is compressed as said hammer means is held on said ledge means due to said offset position of said actuating spring means and released as said actuator means forces said hammer means off said ledge means.

3. An impact type piezoelectric high voltage mechanism as defined in claim 2 further including return spring means which after actuation of said mechanism causes said hammer means to return to its original position adjacent said ledge means so that the piezoelectric mechanism is prepared for another actuation.

4. An impact type piezoelectric high voltage mechanism as defined in claim 1 wherein said ledge means is integrally formed with said housing means.

5. An impact type piezoelectric high voltage mechanism as defined in claim 2 wherein said ledge means comprises a metallic insert.

6. An impact type piezoelectric high voltage mechanism as defined in claim 3 wherein said return spring means exerts force directly on said hammer means.

7. An impact type piezoelectric high voltage mechanism as defined in claim 3 wherein said return spring means exerts force directly on said actuating spring means.

8. An impact type piezoelectric high voltage mechanism as defined in claim 3 wherein said return spring means exerts force on said actuating spring means through said hammer means.

* * * * *